United States Patent
Froumajou

[15] 3,672,698
[45] June 27, 1972

[54] REARWHEEL UNIT OF A VEHICLE HAVING INDEPENDENT WHEELS AND TRAILING LINKS

[72] Inventor: Armand P. Froumajou, Pontoise, France

[73] Assignees: Automobiles Peugeot, Paris; Regie Nationale Des Usines Renault, Billancourt, France

[22] Filed: Aug. 25, 1970

[21] Appl. No.: 66,680

[30] Foreign Application Priority Data

Oct. 30, 1969 France..................................6937292

[52] U.S. Cl..........................................280/124 A, 267/15 A
[51] Int. Cl..........................................B60g 11/56
[58] Field of Search............280/124 R, 124 F; 267/15, 15 A

[56] References Cited

UNITED STATES PATENTS

| | | | |
|---|---|---|---|
| 2,916,296 | 12/1959 | Muller | 267/15 A |
| 3,181,853 | 5/1965 | Howell | 267/15 A |
| 3,332,701 | 7/1967 | Masser | 267/15 A |

Primary Examiner—Philip Goodman
Attorney—Burns, Doane, Swecker & Mathis

[57] ABSTRACT

Rear wheel unit of an automobile vehicle comprising independent wheels mounted on trailing suspension links which are pivoted to the suspended part of the vehicle to pivot about a transverse axis. Each wheel is mounted on a stub-axle which is integral with an axle support connected to the suspension link through a resiliently yieldable pivot device.

5 Claims, 3 Drawing Figures

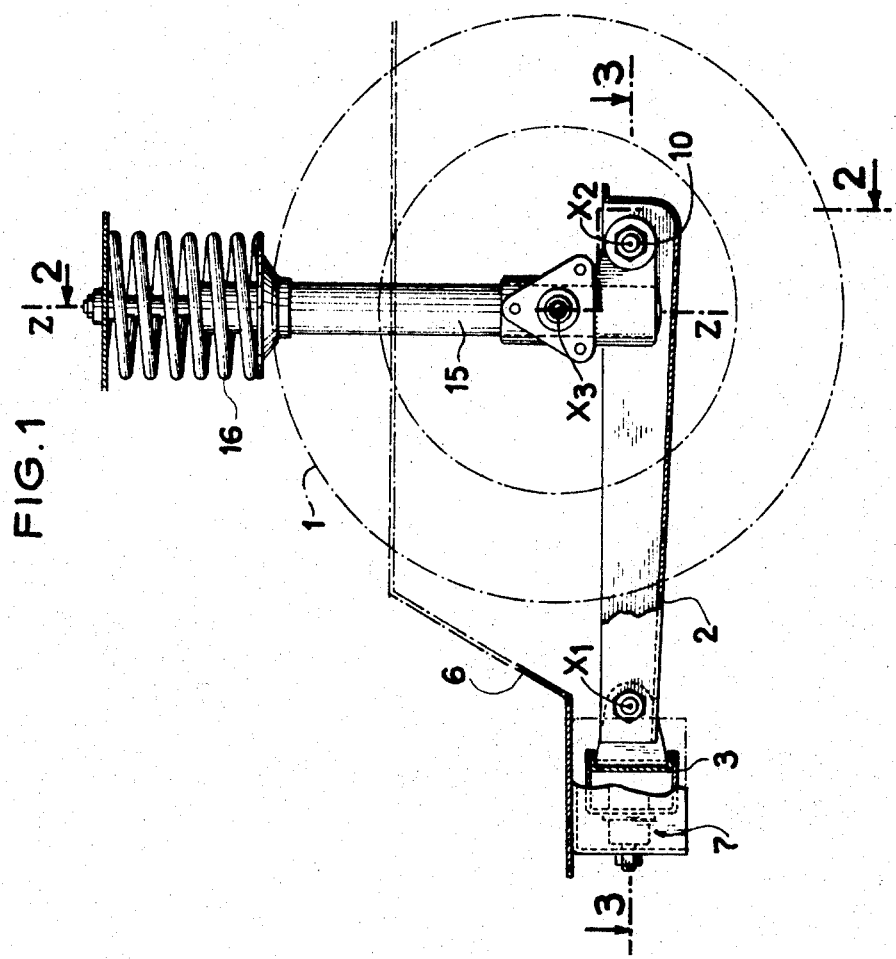
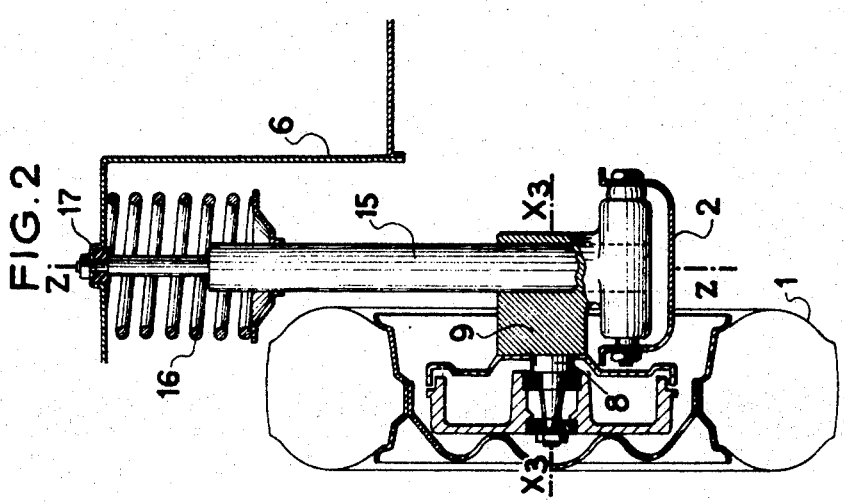

REAR WHEEL UNIT OF A VEHICLE HAVING INDEPENDENT WHEELS AND TRAILING LINKS

The present invention relates to a rear wheel unit for an automobile vehicle of the type having independent wheels and trailing links. It applies more particularly to a front wheel drive vehicle but may also be suitable for a rear wheel drive vehicle.

It is known that in arrangements of this type, the rear wheels are rotatably mounted on stub-axles integral with the rear end of the trailing links. These suspension links are pivoted in their front part to the suspended part of the vehicle by assemblies which allow pivoted movement about an axis roughly transverse to the longitudinal axis of the vehicle and high flexibility in the longitudinal direction while they resist a harmful angular deviation of the wheels. They are moreover connected to the suspended part by conventional suspension means: springs and dampers. In general, the suspension links have a triangular shape and the point of attachment of the stub-axle constitutes an apex whereas the base opposed to this apex is connected to the suspended part of the vehicle by two resiliently yieldable pivotal connections either directly or through a transverse member which is itself resiliently yieldably mounted on the chassis. By the choice of the dimensions and by the nature and stiffness of the resiliently yieldable pivotal connections in the various directions, it is possible to achieve a fairly good compromise giving sufficient flexibility in the longitudinal direction while limiting harmful angular deviations of the wheels.

However, in such a rear wheel unit, and notwithstanding all the precautions taken, it is impossible to completely eliminate any angular deviation of the wheels due to application of a transverse force on the latter. In this case, the assembly comprising the wheel and the triangular suspension link pivots slightly and results in a modification in the path of travel of the vehicle.

Further, when the concavity of the path given to the vehicle faces in a direction opposed to that in which the path deviation is produced, centrifugal force created is added to the disturbing force and consequently tends to amplify the phenomenon of the deviation of said path.

The object of the invention is to remedy this drawback and consequently to improve in a substantial manner the road-holding of the vehicle.

Another object of the invention is to eliminate the twisting torques to which suspension links directly integral with the stub-axle are usually subjected.

The invention provides a rear wheel unit for an automobile vehicle of the type having independent wheels and trailing links pivoted to the suspended part of the vehicle to pivot about an axis roughly transverse to the longitudinal axis of the vehicle, wherein each wheel is mounted on a stub-axle integral with an axle support which is connected to the suspension link through a resiliently yieldable pivot device. Preferably, the pivot device has an axis which is transverse to and located to the rear of a vertical plane containing the axis of the stub-axle.

According to another feature, the axle support is integral with the lower part of a supporting and damping device of telescopic type whose upper part is resiliently yieldably connected to the suspended part of the vehicle.

Further features and advantages of the invention wil be apparent from the ensuing description with reference to the accompanying drawings.

In the drawings:

FIG. 1 is a side elevational view, partly in section, of half of a rear wheel unit according to the invention ;

FIG. 2 is a sectional view taken along line 2—2 of FIG. 1 and

Figure 3:
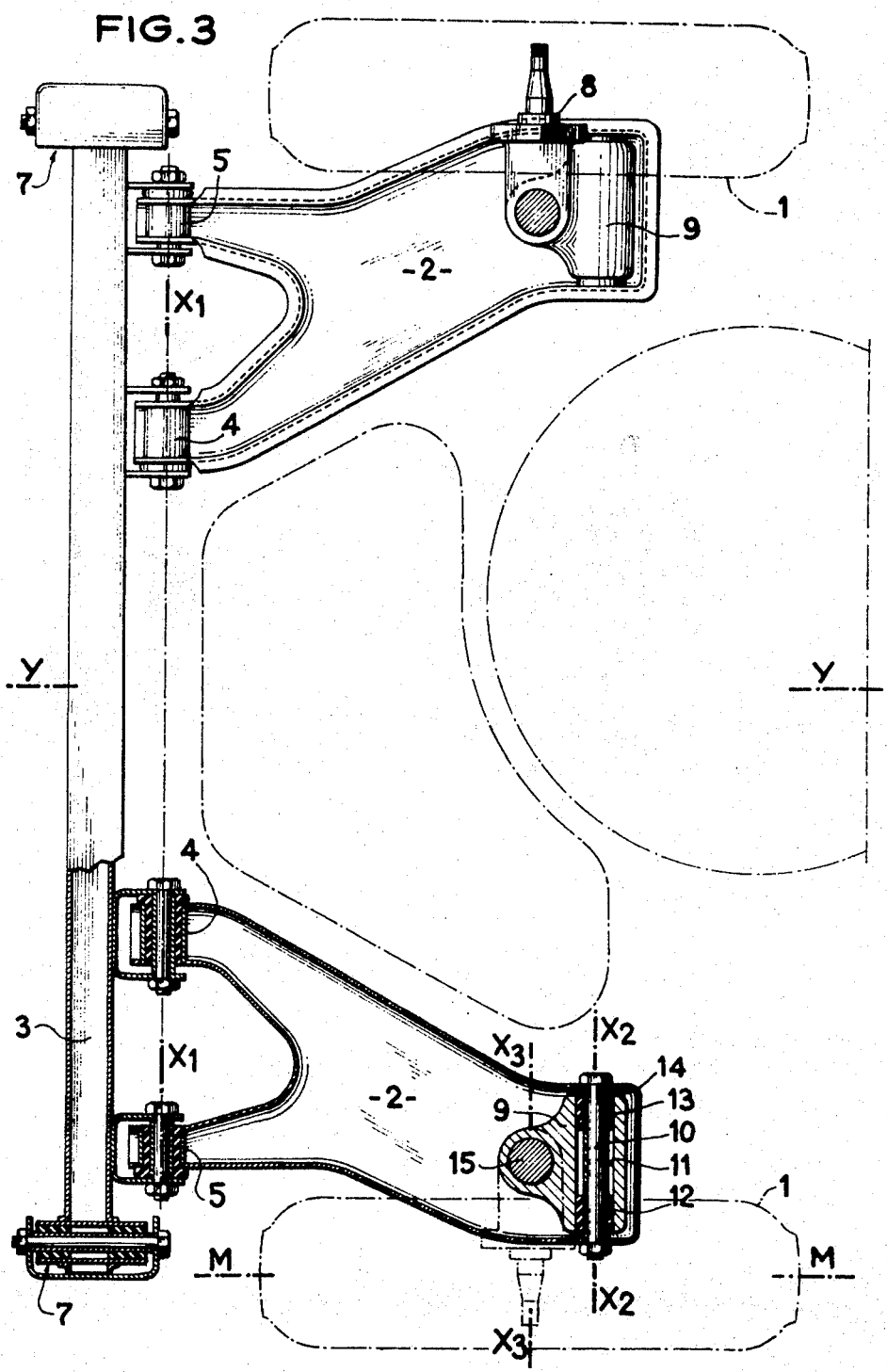
FIG. 3 is a plan view of the rear wheel unit, with a part shown in section taken along line 3—3 of FIG. 1.

In a rear suspension of the type shown in the drawings, each wheel is disposed at the end of a suspension arm or link 2 constituted, for example, by a structure of pressed sheet material. This suspension link is connected in the known manner to a cross-member 3 through two resiliently yieldable pivotal connections 4 and 5 which allow it to move about an axis $X_1-X_1$ which is roughly transverse to the longitudinal axis Y—Y of the vehicle.

The cross-member 3 is connected to the suspended part or body 6 of the vehicle by known resiliently yieldable devices 7.

It must be understood that the invention is also applicable if the suspension links or arms 2 are connected directly to the body 6 without a cross-member.

The wheel 1 is mounted on a stub-axle 8 integral with an axle support 9 pivoted to the link 2 by a pin 10 which has an axis $X_2-X_2$ parallel to the axis $X_1-X_1$ of the pivotal connections 4 and 5 and located to the rear of the verticalplane containing the axis $X_3-X_3$ of the stub-axles 8. For this purpose, the support 9 comprises a rear extension provided with a transverse bore 11 for receiving the pin 10. Two pivotal connections of known type, constituted by sleeves 12 and 13 of rubber or other elastomer, are held between the bore 11 and the pin 10.

The sleeve 12 is located as near as possible to the median plane M—M of the wheel and has for main function to resist longitudinal forces, for example those due to braking. The other sleeve 13 constitutes a direct or pivotal connection for the support 9. The sleeve 13 may have a flange 14 whereby violent lateral forces, for example those due to the wheel striking a pavement, can be absorbed.

The suspension is completed by a conventional supporting and damping device comprising a telescopic hydraulic damper 15 and a coil spring 16 coaxial with the damper. The lower part of the cylinder of the damper 15 is inserted in the support 9 and the upper part of the piston rod of the damper is connected to the body by a resiliently yieldable connection 17.

The axis Z—Z of this support and damping device must be orthogonal to the axis $X_1-X_1$ of the pivotal connections 4 and 5 of the link 2 to the body and to the axis $X_2-X_2$ of the pivotal connection of the support 9 to the link, so as to avoid opposing the movements of the link.

The rear wheel unit operates in the following manner :

When the vehicle is moving, small angular deviations or movements tend to occur under the effect of transverse forces exerted on the wheels. These forces are applied in the region of the zone of contact of the wheel with the ground and have a line of action located, in plan , between the pivotal connections 4 and 5 (having an axis $X_1-X_1$) and the pivotal connection 10-13 (having an axis $X_2-X_2$).

As a consequence of the fact that the axis $X_2-X_2$ is located to the rear of the axis $X_3-X_3$ of the stub-axle, the slight rotations of the support 9 with respect to the link 2 and of the link 2 with respect to the chassis are in opposite directions. Therefore, by suitably choosing the distances between the axes $X_1-X_1$, $X_2-X_2$, and $X_3-X_3$, and suitably choosing the dimensions, the nature and the stiffness of the various pivotal connections, it is easy to exactly compensate these rotations so that the orientation of the median plane M—M of the wheel is unaffected by these transverse forces. This arrangement therefore makes it possible to achieve the desired correction of the angular deviations of the rear wheels and this substantially improves the stability of the vehicle on the road and also avoids additional wear of the tires of the rear wheels.

Another advantage of the arrangement just described is the avoidance of torsion in the suspension links. This advantage is afforded by the fixing of the support 9 to the damper 15. Indeed, owing to this arrangement, the bending moment resulting from the overhang or offset of the wheel is supported by the supporting and damping device, and this results in transverse reactions in the region of the connection 17 and in the region of the pivotal connection 10-13, the latter being in the mean plane of the link 2. The design of this link may therefore be simplified since it supports only forces exerted in its plane. This simplified construction renders this part of the suspension lighter and cheaper.

Having now described my invention what I claim as new and desire to secure by Letters Patent is :

1. A rear wheel unit of an automobile vehicle comprising independent wheels and a trailing suspension link for each wheel pivoted to a suspended part of the vehicle for pivotal movement about a transverse axis substantially transverse to the longitudinal axis of the vehicle, each wheel being mounted on a stub-axle integral with an axle support which is connected to said suspension link through a resiliently yieldable pivot device haVing a pivot axis substantially parallel to said transverse axis and located to the rear of a vertical plane containing the axis of the stub-axle.

2. A rear wheel unit of an automobile vehicle comprising independent wheels, a trailing suspension link for each wheel pivoted to a suspended part of the vehicle for pivotal movement about a transverse axis substantially transverse to the longitudinal axis of the vehicle, each wheel being mounted on a stub-axle integral with an axle support which is connected to said suspension link through a resiliently yieldable pivot device having a pivot axis substantially parallel to said transverse axis and located to the rear of a vertical plane containing the axis of the stub-axle, and a telescopic supporting and damping device having an upper part resiliently yieldably connected to the suspended part of the vehicle and a lower part integral with the axle support.

3. A rear wheel unit of an automobile vehicle comprising independent wheels and a trailing suspension link for each wheel pivoted to a suspended part of the vehicle for pivotal movement about a transverse axis substantially transverse to the longitudinal axis of the vehicle, each wheel being mounted on a stub-axle integral with an axle support which is connected to said suspension link through a resiliently yieldable pivot device having a pivot axis substantially parallel to said transverse axis and located to the rear of a vertical plane containing the axis of the stub-axle, said resiliently yieldable pivot device comprising two spaced pivotal connections having sleeves of elastomer held between a bore in the axle support and a pin integral with the suspension link.

4. A rear wheel unit as claimed in claim 3, wherein a sleeve of said rubber or elastomer sleeves which is the more remote from the general plane of the wheel has a flange constituting a transverse thrust member interposed between the axle support and the suspension link.

5. A rear wheel unit as claimed in claim 2, wherein the supporting and damping device has an axis which is substantially orthogonal to said transverse axis.

* * * * *